Oct. 5, 1954 L. L. KOROS 2,691,140

FREQUENCY CONTROL SYSTEM

Filed Oct. 3, 1951 4 Sheets-Sheet 1

INVENTOR

Leslie L. Koros

BY

Charles H. Brown

ATTORNEY

INVENTOR
Leslie L. Koros
BY
Charles H. Brown
ATTORNEY

INVENTOR
Leslie L. Koros
BY Charles H. Brown
ATTORNEY

FREQUENCY CONTROL SYSTEM

Filed Oct. 3, 1951 4 Sheets-Sheet 4

INVENTOR
Leslie L. Koros
BY Charles H. Brown
ATTORNEY

Patented Oct. 5, 1954

2,691,140

UNITED STATES PATENT OFFICE 2,691,140

FREQUENCY CONTROL SYSTEM

Leslie L. Koros, Camden, N. J., assignor to Radio Corporation of America, a corporation of Delaware Application October 3, 1951, Serial No. 249,507

13 Claims. (Cl. 332—37)

This invention relates to frequency control systems, and more particularly to systems for controlling or stabilizing the frequency of an ultra-high-frequency or mircowave oscillator. Although this invention is applicable to oscillators or amplifiers of various types, it is particularly adapted for the control of magnetron oscillators such as might be used in television transmitters and which operate in the frequency range of 600 to 1000 megacycles; therefore, the invention will for convenience be described in connection with oscillators of this type. Any other kind of oscillators, as e. g. klystrons, traveling wave tubes or resnatrons can be used for the invention also.

In my copending application, Serial No. 177,455, filed August 3, 1950, there is described a system for controlling or stabilizing the frequency of a magnetron oscillator by a procedure termed "injection" or "injection locking." In this system, a small amount of power from a stable locking frequency source is injected directly into the magnetron cavity or cavities to lock the magnetron frequency. The frequency of this stable locking source may be equal to the magnetron frequency or may be harmonically related thereto.

In some cases, the "injection" may be applied to some electrode of the oscillator other than the load-coupling means of the same. Any control electrode, loop, or grid of the oscillator, which serves for control frequency input, can be used with the circuits described in the present invention.

An object of this invention is to increase the efficiency of an injection locking system of the above-described type or types, whereby the necessary locking power may be decreased.

Another object is to reduce the phase distortion in systems of the aforementioned type to a value which can more readily be tolerated.

A further object is to reduce the "pushing" or frequency change resulting from the amplitude modulation of certain types of ultra-high-frequency oscillators, such as magnetrons.

A still further object is to reduce the incidental phase modulation of amplitude modulated amplifier stages operating with amplifier tubes, as, e. g., triodes, tetrodes, klystrons or traveling wave tubes. If the invention is applied to such cases where the output tube is an amplifier and not an injection-locked oscillator, the driver or exciting R.-F. power of the amplifier takes the role of the injection power and the circuits described herein may be used between the amplified output and driver powers.

The foregoing and other objects of the invention will be best understood from the following description of some exemplifications thereof, reference being had to the accompanying drawings, wherein.

Figure 1:
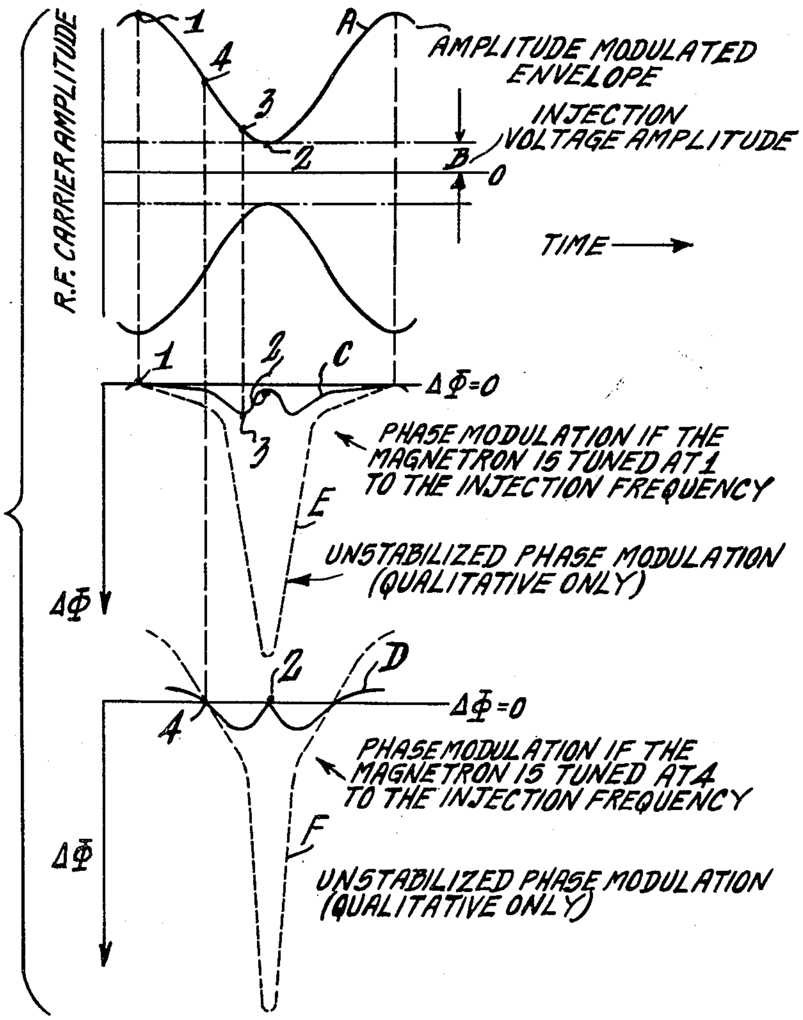
Fig. 1 is a set of curves illustrating various frequency and phase relations existing in my system.

The objects of this invention are accomplished, briefly, in the following manner: In a frequency control system for an amplitude modulated oscillator of the magnetron type, wherein an injection voltage or a locking signal is utilized for frequency and phase stabilization of the oscillator, the locking signal is frequency or phase modulated to counteract "pushing" of the amplitude modulated oscillator. The phase modulating signal for the locking source is derived by a detector for angular modulation from the oscillator output or by beating together the amplitude modulated output of the oscillator and stable-frequency energy from a crystal-controlled source. The term "angular modulation" is herein used to refer to either frequency or phase modulation.

When a magnetron oscillator was anode modulated and locked to an injection source, as described in my aforementioned application, it was found that during the modulation process angular modulation is imposed to some extent on the modulated oscillator. This angular modulation is a consequence of radio frequency phase differences between the controlled oscillator signal and the locking or injection signal, primarily due to the "pushing" frequency change effect resulting from the amplitude modulation of the magnetron oscillator. However, this kind of phase or frequency modulation can be produced in other ways than as a consequence of amplitude modulation of the oscillator; this invention serves to correct phase or frequency errors of any kind. The phenomenon of incidental angular modulation occurs also with amplitude modulated amplifiers.

A theory exists, which states that the incidental phase modulation of a phase-stabilized oscillator may become 90° before the locking is broken. In practical cases, the 90° phase modulation is not reached, but phase modulations of 30° to 40° were sometimes experimentally observed, in the steady state condition. An increased ratio of locking current to oscillator current decreases the phase difference between the outputs of the controlled oscillator and of the locking source. However, it is advisable to economize on injection power and to make a given amount of injection power as effective as possible to control the highest oscillator power. According to this invention, a system which is highly efficient in this way is provided.

The amplitude or angular modulation of the injection power for control purposes has been described in my application previously referred to. However, it has now been found that the control can be carried out in a more efficient manner if the angular modulating signal is derived in some way from the controlled oscillator and imposed 180° out of phase on the injection source. This is especially true since the type and frequency of the phase modulating signal, or in other words, of the phase distortion observed on the oscillator carrier, depend not only on the frequency which amplitude modulates the oscillator, but also on the relative tuning condition of the controlled oscillator and injection source.

The phase deviation can be expressed as a frequency deviation, according to the known relationship $$\Delta\Phi = \frac{\Delta F}{p} \qquad (1)$$

where $\Delta\Phi$ is the phase deviation, $\Delta F$ is the frequency deviation and $p$ is the modulating frequency. Fig. 1 illustrates, by way of example, various phase relations between the oscillator and locking source. First will be considered the case in which the unstabilized oscillator is tuned to the injection source frequency at the peak power oscillator output, so that the peak output of the amplitude modulated and unstabilized oscillator and the unmodulated locking source have the same frequency. Generally, there is no requirement that the system be tuned to this condition. The particular case will show, however, one of the possible forms of phase distortion. Waveform A represents the amplitude modulated envelope of the magnetron oscillator at its load. The dimension B represents the value above zero of the minimum amplitude of the radio frequency carrier, which value (at the trough of the modulation) is almost identical with the power supplied to the load by the injection source, because the oscillator is being amplitude modulated in our example almost 100 percent. Waveform C represents qualitatively the phase difference versus time, between the oscillator and the injection source. At the time instant denoted by point 1, $\Delta\Phi=0$, since it is assumed, only by way of example, that the peak power output of the unstabilized oscillator and the injection source have the same frequency. At time instant 2 the phase difference between the oscillator and injection source is again almost zero, because at this instant almost no power output from the oscillator is delivered into the load, only the injection power output being then delivered into the load. It is desired to be pointed out again that dynamic phase differences between the oscillator and the injection source arise because of the fact that certain oscillators, more particularly magnetrons, are subject to "pushing," which results in phase changes in the oscillator output as the amplitude of the output changes due to modulation. To some extent, however, amplifier tubes also show incidental phase modulation. The solid line curve C represents qualitatively the controlled magnetron phase deviations (that is, those appearing when an injection-locking frequency control is used). The dashed line curve E represents qualitatively the uncontrolled magnetron phase deviations, that is, those which could be observed on the magnetron carrier if no phase control were applied, in which event the magnetron is unstabilized.

The critical time instant in connection with our example is point 3, located somewhere between points 1 and 2. At point 3 the phase deviation of the modulated oscillator must reach a maximum. Curve C represents the $\Delta\Phi$ fluctuation during the modulation cycle, or at a given modulating frequency, the $\Delta F$ fluctuation. It may be seen, from curve C, that the $\Delta\Phi$ fluctuation is substantially of double the modulating frequency (curve A).

In another case, we may arbitrarily tune the frequency of the median point (marked as 4 in Fig. 1) of the envelope wave of the oscillator to the injection source frequency. Curve D represents the phase deviations which may exist between the oscillator and injection source in this case. From an examination of curve D, it may be seen that in this case the $\Delta\Phi$ fluctuation curve contains components of the amplitude modulation frequency and also of double the amplitude modulation frequency. In Equation 1 above, the "modulating" frequency $p$ is the frequency of the phase distortion actually produced, as it can be seen from curve C or D in Fig. 1. Here again, the solid line curve D represents qualitatively the controlled magnetron phase deviations, while the dashed line F represents qualitatively the uncontrolled phase deviations (that is, those appearing when no frequency or phase control is applied, when the magnetron is therefore unstabilized).

The practical cases above described have demonstrated that the phase fluctuations are not always of the same frequency as the amplitude modulating frequency applied to the oscillator. Later, we will show some other reasons why the amplitude modulation and phase modulation frequencies can be different.

Figure 2:
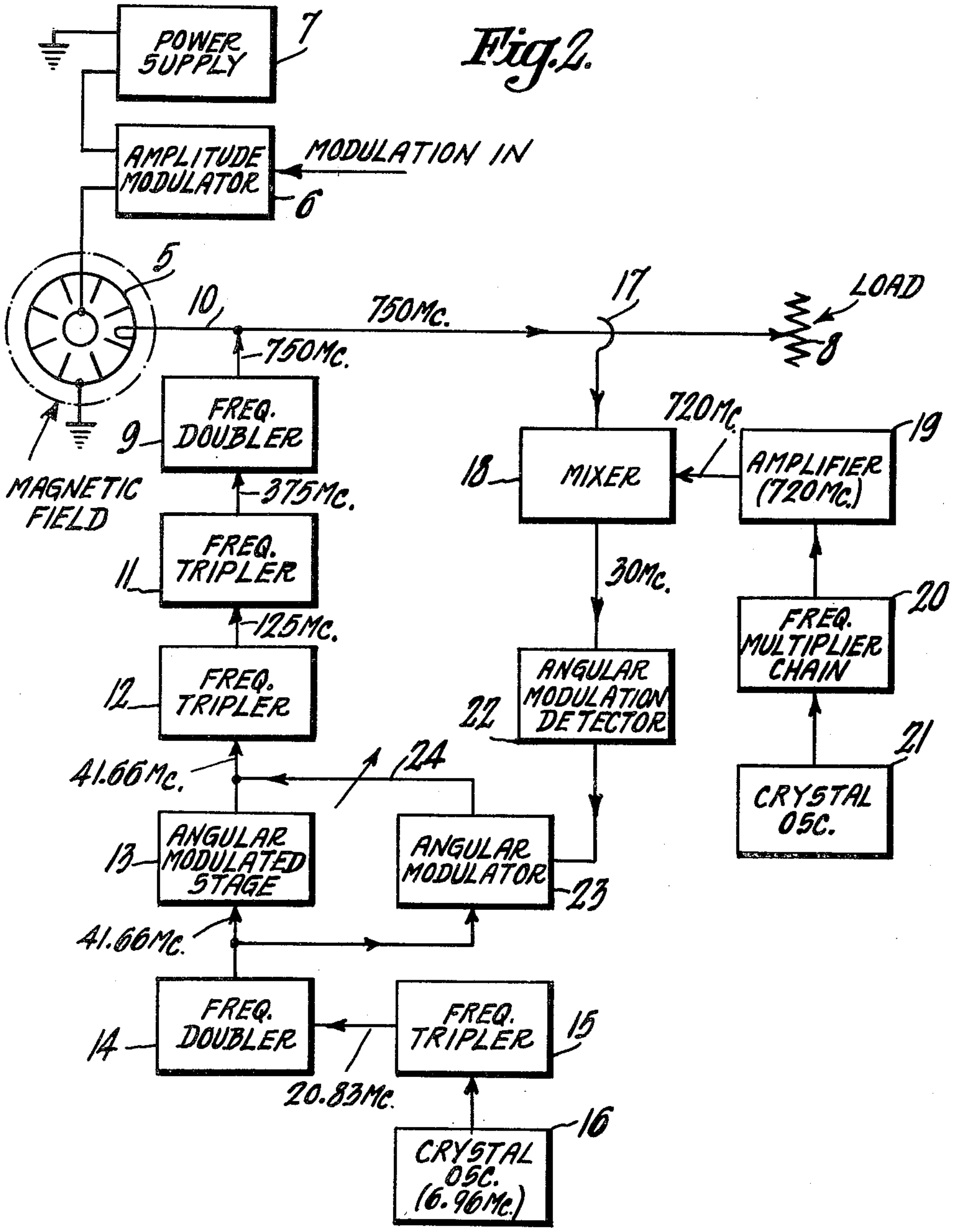
Fig. 2 is a block diagram of a system according to this invention.

Fig. 2 shows in block diagram form a system which is useful for reducing the undesired phase differences previously referred to. Magnetron 5 (represented in more or less stylized form as having a cathode surrounded by a plurality of radially-directed anode vanes, together with an axial magnetic field, indicated by the dot-dash circle) is anode modulated by means of an amplitude modulator 6 which is connected to the cathode of magnetron 5 and to which a suitable modulating signal is applied. The anode of magnetron 5 is grounded, as is one terminal of the power supply 7 the other terminal of which is connected through modulator 6 to the cathode. Oscillatory energy is fed from magnetron oscillator 5 to an antenna or dummy load 8. The anode circuit of an injection amplifier 9, which is a frequency doubler, is tuned to 750 megacycles, which is selected as the UHF oscillator frequency in this example, while the grid of this amplifier is driven by 750/2, or 375 mc. The anode circuit of amplifier 9 injects energy of a frequency of 750 mc. into the main transmission line 10, which extends between magnetron 5 and load 8. Tripler stages 11 and 12 are coupled together in cascade, the frequencies at the inputs and outputs of these stages being as indicated and the output of stage 11 feeding oscillatory energy of 375 mc. into the grid or input circuit of doubler stage 9. The output of an angular modulated stage 13 is fed to the input of tripler 12. The angular modulator for stage 13 will be described hereinafter. The crystal oscillator stage 16 feeds energy of 6.96 mc. into a frequency tripler stage 15 the output of which feeds into a frequency doubler stage 14; 41.66-mc. energy from doubler 14 is fed to angular modulated stage 13.

A pick-up probe 17, coupled to the oscillator output transmission line 10, feeds a portion of the oscillator output to mixer 18. An amplifier 19 provides a source of stable frequency which is also fed to mixer 18. In this example, we have selected the frequency of 19 to be separated by 30 mc. from the oscillator frequency; this means that the output frequency of 19 will be 720 mc. Amplifier 19 is driven by another frequency multiplier chain 20 from the crystal oscillator stage 21. Mixer 18 mixes the two frequencies applied to it from 17 and 19, to produce the 30-mc. difference or beat frequency. This 30-mc. beat frequency carries the phase distortion.

The output of mixer 18 is fed to an angular modulation detector 22 of any type, for example a so-called ratio detector. The output of this detector will contain phase distorting components but no amplitude modulation components. The modulation detector must include in some cases one or more amplitude limiter stages. The phase distorting components, of different "$p$" frequencies, from the output of detector 22, are applied to the input of the angular modulator 23. The angular modulation detector 22 and angular modulator 23 can be phase or frequency detectors and modulators, respectively. It is important, however, particularly where the correction must act for a rather broad modulating frequency spectrum, that if a phase detector is applied, a phase modulator be used, and that if a frequency modulation detector is applied, a frequency modulator be used. Modulator 23 is also supplied with energy of 41.66 mc. from the output of doubler 14. If a conventional phase modulator is used modulator 23 can be a class C amplifier supplied with carrier energy excitation from unit 14 and amplitude modulated by the output of a phase detector 22. The amplitude modulated output of 23, if a conventional phase modulator is used, is added, by means of a connection schematically illustrated at 24, in phase quadrature to the output of stage 13, as is common practice in phase modulator circuits. The connection 24 may have included therein a phase shift network, as indicated by the arrow in this connection. The discriminator output connections must be so polarized that the phase modulation is 180° out of phase with the disturbing phase modulation appearing in the oscillator output at antenna 8. Thus, a negative feedback loop is established which will reduce the phase distortion in the modulated oscillator 5 by an amount to be set forth hereinafter. Between the detector 22 and angular modulator 23 amplitude correcting, phase correcting and/or peaking elements can be inserted. The effect of such elements can be limited to some particular modulating frequencies, if desired.

Figures 3, 4:
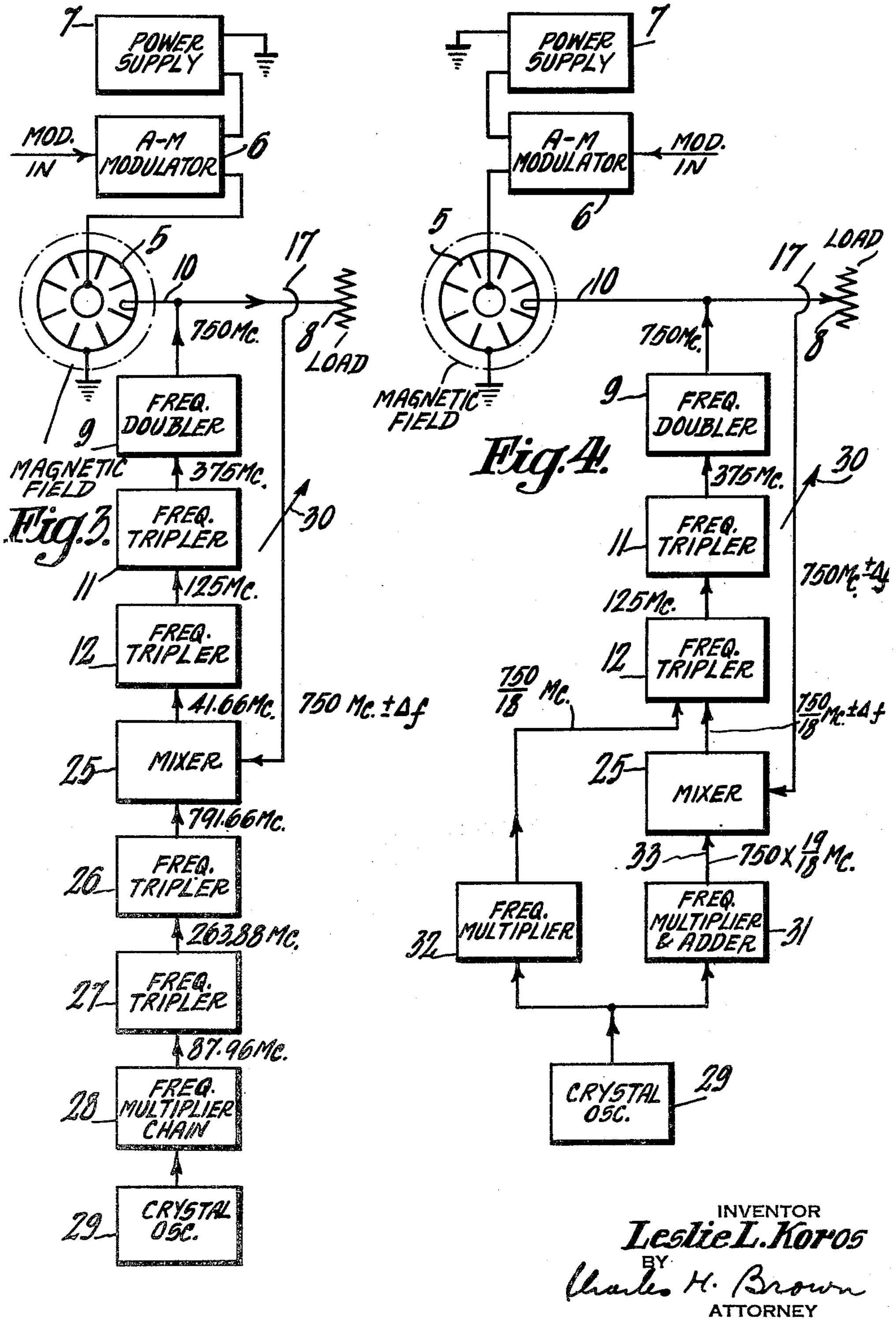
Figs. 3, 4 and 5 are block diagrams of modified systems.

A somewhat simplified phase correction circuit is illustrated in Fig. 3. The principal difference between Figs. 2 and 3 is that in the Fig. 3 circuit I do not detect the disturbing information (phase or frequency modulation of the oscillator output), but rather I use the phase or frequency distorted radio frequency output in a more or less direct manner, to correct the phase or frequency of the oscillator 5. In this way, the time delay for correction is considerably reduced. This may have importance for broad modulating frequency bands, as required e. g. for multiplex communication links or for television purposes.

In Fig. 3, the numerals 5 through 12 and 17 denote the same components as the similar numerals in Fig. 2. The system will be explained with the help of an example. The frequency variation of the stabilized magnetron 5 at a given modulating frequency $p$ has in an example a maximum value of 1 kc. The output of mixer 25 is fed to frequency tripler 12 and this mixer is receptive of stable frequency wave energy from tripler 26, of 750+41.66=791.66 mc., and of sampled frequency wave energy from the oscillator output transmission line 10, of 750±1 kc. Energy from the oscillator output is fed to mixer 25 by means of a trombone line, or some other R.-F. phase changing device indicated schematically by arrow 30. There is produced in mixer 25 the difference frequency of its two inputs, this difference frequency being 41.66 mc.±1 kc. As previously stated, frequency tripler 26 delivers wave energy of 791.66 mc. to mixer 25. Frequency tripler 27 feeds wave energy to the input of tripler 26 and the input of tripler 27 is in turn supplied from a crystal oscillator 29 through a frequency multiplier chain 28.

Of course, any other source of sufficiently stable frequency may replace the crystal source 29. Furthermore, a frequency modulated or phase modulated radio frequency source could be applied to mixer 25 instead of the crystal-controlled frequency source illustrated, if it is desired to produce a given frequency or phase modulation of oscillator 5. In other words, the input of the stage 26 into the mixer can be either crystal-controlled and stable, or modulated by a frequency or phase modulator.

In order that the operation of the Fig. 3 system may be better understood, a further example will be given. If for some reason the frequency of oscillator 5 has drifted to 750 mc.+1 kc., the output of mixer 25 will not be 41.66 mc., but 791.66 mc.−(750 mc.+1 kc.)=41.66 mc.−1 kc. Thus, the frequency deviation of the oscillator 5 is inverted or changed to the opposite direction, from a positive frequency error to a negative correcting signal. This −1 kc. signal is now multiplied eighteen times in our example (by tripler 12, tripler 11 and doubler 9 in cascade), so that a high correcting-frequency signal is applied to the carrier emitted from oscillator 5, by means of the frequency doubler or locking amplifier 9. The correcting signal is −1 kc.×18=−18 kc. The magnetron frequency deviation from the ideal 750 mc. is +1 kc., assumed in our example. Therefore, the difference between the magnetron frequency and the injection frequency is $$18+1=19 \text{ kc.}$$

Generally, if a frequency multiplication factor of N is used between the output of mixer 25 and the output of the final frequency multiplier 9, and if we may have a frequency or phase difference of $\pm\Delta F$ or $\pm\Delta\Phi$, respectively, between the outputs of 5 and 9, the frequency deviation and phase deviation of 5 from the desired frequency (which is 750 mc. in our example) become:

$$\pm\Delta f=\frac{\pm\Delta F}{N+1} \qquad (2)$$

or at a given modulating frequency we may write:

$$\pm\Delta\varphi=\frac{\pm\Delta\Phi}{N+1} \qquad (3)$$

In Equations 2 and 3, $\pm\Delta F$ and $\pm\Delta\Phi$ are respectively the incidental frequency or phase deviations, observed as resultant deviations on the carrier of 5, from 750 mc. In our example, $\Delta f$ is 1 kc., since we assumed a drift or deviation of 1 kc., from 750 mc., in the frequency of oscillator 5. In Equations 2 and 3, $\pm\Delta F$ and $\pm\Delta\Phi$ are respectively the frequency or phase deviations between the output carrier of 5 and the injection source output. $\Delta F$ is 19 kc.

In our example, $N=18$, $(3\times3\times2)$, so that from (2) the steady state deviation $\Delta f$ is 1 kc. and is equal to $$\frac{\pm\Delta F}{18+1}=\frac{\pm\Delta F}{19}$$

If, as a further example, the modulating frequency is $p=100$ kc., with $\Delta f=1$ kc., from Equation 1 the magnetron phase deviation is $\Delta\phi=.01$ radian and the difference between the magnetron and injection source is $\Delta\Phi=.19$ radian, from Equation 3. This example demonstrates that according to this invention the magnetron phase distortion with an injection-locking system has been reduced to a very low value.

The amplitude modulation, which appears in the pick-up probe 17, is sufficiently suppressed in the multiplier chain 9, 11 and 12. If the suppression of the amplitude modulation in this chain is not sufficient, amplifiers with saturated grids, or limiter stages, can be interposed.

The system of Fig. 3 might be deprived of a locking signal at times when the oscillator 5 is overmodulated, since for these short time intervals the mixer 25 would be without its 750-mc. input. It is expected that this kind of difficulty will not be met with in a television picture transmitter because the carrier should not be modulated deeper than 85% in this case. However, to obviate the abovementioned difficulty, and for other than television application, locking power which is not phase modulated can be applied to the magnetron, this locking power being applied conjointly with the phase modulated locking power previously described in connection with Figs. 2 and 3.

Fig. 4 illustrates a circuit arrangement for practical realization of the idea mentioned in the preceding paragraph. A crystal stage 29 feeds wave energy of stable frequency through a frequency multiplier and adder chain 31 to mixer 25. Another frequency multiplier chain 32 feeds the tripler stage 12 directly. Chain 31 produces by multiplying and adding the crystal-frequency, a frequency in its output connection 33 which has the value of carrier-frequency $$\times\frac{N+1}{N}$$

whereas chain 32 produces the carrier-frequency $$\times\frac{1}{N}$$

After mixing the output of the chain 31 with the magnetron output obtained by way of the interconnection pickup device 17 and phase network 30, the mixer 25 delivers to the tripler 12 the carrier $$\times\frac{1}{N}$$

frequency F the incidental angular modulating component. The output of the mixer becomes somewhat amplitude modulated in this system and the previous phase relations of the 750 mc.$\pm\Delta f$ wave derived from oscillator 5 are somewhat altered, but these by proper design may have no practical influence on the working of the system.

According to the arrangement of Fig. 4, there is a continuous input of wave energy for tripler 12 derived from multiplier 32; thus, there is a locking signal for the magnetron 5 available at the output of doubler 9 at all times, even though the oscillator 5 is overmodulated at intervals such that during these intervals there is no 750-mc. input to mixer 25, so that during these intervals there would be no beat frequency output from said mixer.

Figures 5, 7, 8:
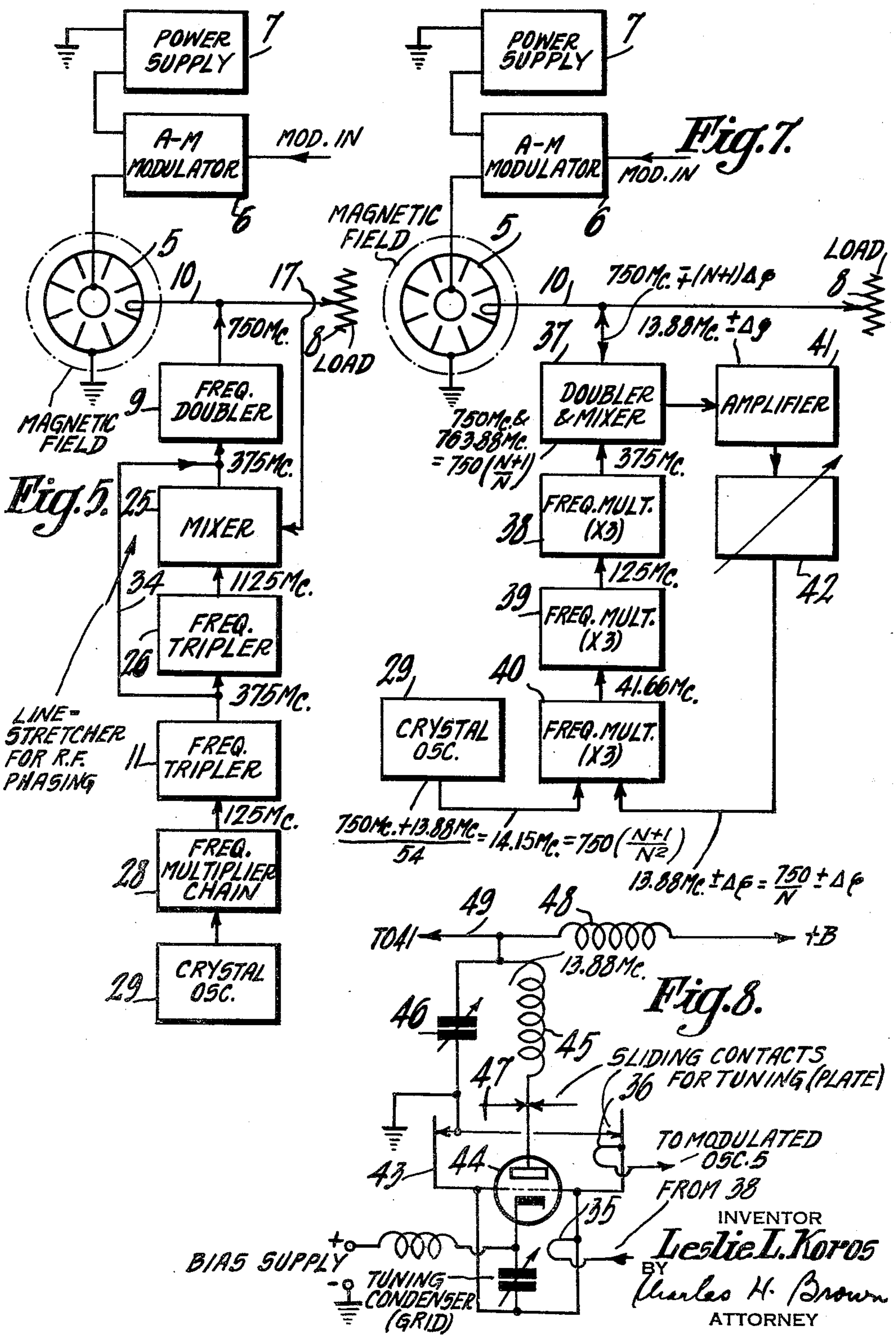
Fig. 7 is a block diagram of a modification of Fig. 3.
Fig. 8 is a structural representation of one of the components of the Fig. 7 system.

Fig. 5 shows another variation in which the non-phase-modulated locking signal and the phase-modulated locking signal are both derived from a single crystal stage. The system is explained by an example. The frequencies and multiplications can be, however, different from the example. Crystal stage 29 feeds stable frequency wave energy through a frequency multiplier chain 28 the 125-mc. output of which is tripled in frequency tripler 11. A portion of the output of tripler 11 is tripled in frequency by unit 26 and is then fed to mixer 25 as an 1125-mc. input for this mixer. By means of pick-up probe 17, sampled 750-mc. energy from oscillator 5 is also fed to mixer 25, so that a beat frequency of 375 mc. appears at the mixer output. The output of mixer 25, which carries phase modulation in the manner described in connection with Fig. 3, is doubled in frequency in doubler 9 and the doubler output is used as an injection voltage or locking signal for oscillator 5, by applying such doubler output to main transmission line 10. In order to apply a non-phase-modulated locking signal to the magnetron oscillator, a portion of the 375-mc. output of tripler 11 is abstracted and applied, by means of a transmission line schematically indicated at 34, directly to the input of frequency doubler 9. As indicated in Fig. 5, line 34 has included therein a line stretcher, to provide proper radio frequency phasing.

According to the arrangement of Fig. 5, there is a continuous input of 375-mc. wave energy for doubler 9 from tripler 11; thus, there is a locking signal for the magnetron oscillator 5 available at the output of doubler 9 at all times, even though during certain intervals there is no 750-mc. input to mixer 25. It can be seen that the locking power applied by way of line 34 to the magnetron is not phase modulated.

It is desired to be reiterated that, although the output of the frequency doubler 9 in Figs. 3, 4 and 5 has been indicated as being 750 mc., this has been done only for the sake of convenience. Actually, the output of doubler 9 will include a term dependent on the error frequency of the oscillator output. According to Equations 2 and 3 above, this term will depend on the factor $(N+1)$, where N is the multiplication factor used between the output of mixer 25 and the output of the final doubler 9. Also, as appears from the analysis previously given, the output of doubler 9 will be changed with respect to the magnetron oscillator error frequency. In Fig. 5, for example, the multiplication factor N has a value of two. Therefore, if the input frequency to mixer 25 derived from probe 17 is 750 mc.$\pm$the error frequency, the output of doubler 9 will be 750 mc. $\mp$ three times the error frequency. Instead of the single stage 9, two or more cascaded amplifier stages can be used, within the scope of this invention.

The absolute phase difference between the magnetron oscillator and injection carriers is practically not changed as a consequence of the injection feedback system of this invention. This phase difference can become as high as ±90° (1.57 radian) before the locking breaks. By this invention, what is radically changed due to the feedback is the relative phase relation of the magnetron oscillator carrier vector, compared with an ideal unchanged phase condition. This can be more readily understood by reference to the vector diagrams of Fig. 6, in which the left-hand diagram represents the phase relation in previous systems while the right-hand diagram represents the phase relation in the systems of the present invention. It can be seen that the two angles marked $\Delta\Phi$ (between the magnetron oscillator vectors and the standard signal vectors) are almost equal but that in the present system the angle marked $\Delta\phi$, the angle between the oscillator carrier vector and the ideal unchanged phase condition, has the value stated in Equation 3 and is much smaller than the angle $$\Delta\Phi$$

In the system of this invention, the standard or injection signal vector is in its "ideal phase" position only if no disturbing signal is present on the magnetron carrier. In the presence of a disturbing signal, the injection signal vector starts to oscillate up to a higher frequency than the magnetron frequency and then back down in the opposite direction to a lower frequency. This pulls the magnetron carrier vector nearer to the "ideal phase" position.

Figure 6:
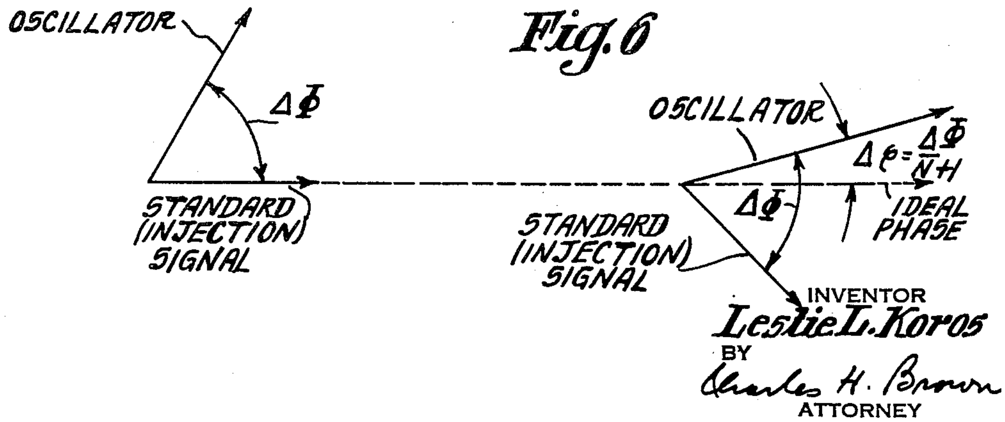
Fig. 6 is a vector diagram useful in explaining the invention.

If the amplitude modulated tube is an amplifier, the negative feedback link must be applied between the output and R.-F. exciting or driving power of the amplitude modulated stage. Fig. 6 represents in this case the relative positions of the amplitude modulated amplified output carrier vector (marked as "oscillator" in Fig. 6) and of the driver vector (marked as "standard injection signal" in Fig. 6).

The system of this invention is intended for use also with broad-band multiplex communication circuits or with high video modulation frequencies. In such cases, it is reasonable to keep the number of frequency multiplier and amplifier stages to a minimum and to use intermediate stages of such a high frequency that the intermediate stage may carry the phase error signal. In other words, if it is a requirement that the feedback should be effective at very high modulating frequencies, the frequency multiplication factor, N, should not be selected too high. If the amplitude modulating frequency is high, it is advisable to use fewer frequency multiplier stages between the mixer and the injection amplifier, in order to avoid the use of amplifiers in the phase modulated part of the multiplying chain which are working at low frequencies compared with the band width. If, as an example, $N=3$ and the output carrier frequency is 750 mc., then the lowest phase modulated chain frequency is 250 mc. An amplifier working at 250 mc. can easily carry broad-band frequency (phase) error information possessing at least 20 mc. of R.-F. bandwidth.

The systems described can be applied not only to the active injection of locking power or to an excited amplifier stage, but also to any frequency or phase control system where a standard frequency is utilized. Also, the systems can be made to work with other frequency controlling elements on the oscillator, as for example reactance tubes.

Fig. 7 shows a simplified form of the system described previously in connection with Fig. 3. The two frequency multiplier chains in Fig. 3, one of which is composed of the multiplier stages 9, 11, and 12, and the other composed of the multiplier stages 26, 27, 28, are replaced in Fig. 7 by only one chain composed of multiplier stages 37, 38, 39 and 40. The doubler stage 37 is used as an injection amplifier and mixer. Details of a construction for stage 37 will be shown later in Fig. 8.

The oscillator output frequency was selected in this example to be, again, 750 mc. A crystal-controlled frequency of $$\frac{750+13.88}{54}=14.15 \text{ mc.}$$

is applied to the input of the 54-times frequency multiplier chain 37–40, in which N of course has a value of 54. The output of crystal stage 29 thus has a frequency of $$750\left(\frac{N+1}{N^2}\right) \text{ mc.}$$

This frequency, multiplied by 54 in the chain 37–40, results of course in a frequency of $$763.88 \text{ mc.}=750\left(\frac{N+1}{N}\right)$$

at the output side of stage 37. Since, as previously stated and as will hereinafter appear more fully, the doubler stage serves as a mixer, the line connecting the output side of 37 to main transmission line 10 carries a double-headed arrow, meaning that voltage waves of 750 mc. (approximately) may pass both ways between transmission line 10 and the output side of 37.

The oscillator's output frequency is 750 mc. The oscillator voltage wave enters to some extent into the anode injection cavity (43, Fig. 8) in stage 37, anode modulating to some extent the injection tube (triode or tetrode) in such stage. In this way, the 750-mc. oscillator frequency and the crystal-derived-and-controlled 763.88-mc. frequency mix in the said anode injection cavity of 37, producing among other beat frequencies a 13.88-mc. difference frequency. By means of a suitable network (45, 46, 47 in Fig. 8) tuned to this difference frequency, said frequency can be separated out and passed to amplifier 41 for amplification therein.

This 13.88-mc. beat frequency, since it is derived by mixing together the oscillator output and a higher stable frequency (the action thus being similar to that of mixer 25 in Figs. 3–5), carries the incidental angular modulation 180° out of phase, as has previously been described in connection with Figs. 3–5.

The 13.88-mc. beat frequency, carrying the incidental phase modulation in this way, is applied to the input of tripler 40, from the output of amplifier 41, through a phase shifter 42. The frequency multiplier chain 37–40, having a multiplication factor, N, of 54, produces the 750-mc. injection frequency from the 13.88-mc. input to stage 40, as indicated in Fig. 7. The frequency multiplier chain must of course have a pass band sufficiently wide to encompass the crystal-derived frequency and the beat frequency for injection, as well as the incidental angular modulation of the 750-mc. carrier. The injection frequency is injected into transmission line 10, as indicated, for stabilization of oscillator 5.

The crystal frequency must be of considerably lower level than the injection signal in each multiplier stage. One reason for this is to keep reasonably low the amplitude of such higher order beat frequencies of the two signals as are within the bandwidth of the chain. Another reason is to reduce the level of the amplitude modulation component in the beat.

Fig. 8 shows a typical circuit arrangement for the injection amplifier (doubler) and mixer stage 37. In this example, the injection amplifier tube 44 is a triode which is placed in a cavity 43. Said cavity has an input loop 35 for the 375-mc. excitation wave, applied from tripler stage 38, and also has an output loop 36 which carries the 750-mc. injection voltage to the modulated oscillator 5 by way of transmission line 10. Loop 36 also introduces oscillator output voltage into the cavity 43. The crystal-controlled voltage (derived from 29 through multiplier stages 40, 39 and 38), together with the oscillator voltage, are in effect rectified in the anode circuit of tube 44. The anode current of tube 44 includes impulses having a repetition rate which corresponds to the difference frequency of 13.88 mc. The inductance 45, with capacitors 46 and 47, together comprise a tuned circuit tuned to 13.88 mc. Capacitor 46 is an added tuning capacitor, while 47 is the bypass capacitor of cavity 43. Choke 48 keeps the 13.88-mc. current out of the direct voltage source, while connection 49 couples the 13.88-mc. current to amplifier 41.

According to the arrangement of Fig. 7, a simplified feedback system is provided, one which requires fewer of the expensive circuit components than does Fig. 3, for example.

The circuits according to this invention are shown with examples. An output frequency of 750 mc. is specified and frequency multiplier stages with multiplying factors of two and three are shown. Examples with specific numbers are used only to make it easier to read the description. The output carrier is by no means limited to any particular frequency. Although it is believed that the invention has special merit for frequencies above 500 megacycles, up to several ten-thousands of megacycles, a lower or upper limit for the carrier frequency does not exist. Frequency multiplier chains of any kind of construction can be used. The frequency multiplication factor which can be achieved by one stage can be higher than two or three, as used in the examples. As an example, multiplication factors of eight to twelve can be produced with frequency multiplier klystron tubes, as known in the art.

If an injection source having a frequency different from that of the oscillator is used, e. g., one having a frequency which is a submultiple or subharmonic of the oscillator frequency, the frequency multiplying factor, N, is the ratio of the oscillator carrier frequency to the frequency of the particular stage wherein the angular modulation is introduced into the frequency multiplier chain of the injection source. It is within the scope of this invention to use an injection source having a frequency which is a subharmonic of the oscillator frequency.

Although this invention has been described by way of example as applied to an injection locking system in which power is injected into the oscillator to lock or stabilize its frequency, said invention may be applied also to locking or frequency stabilizing systems of other types. For example in my copending application, Serial No. 181,331, filed August 25, 1950, there is described a frequency stabilizing system which effects stabilization by loading of the oscillator at predetermined time intervals, the loading being accomplished by means of a loading tube to which a stable frequency control voltage is applied. In order to reduce incidental phase modulation in a system of this type, the control voltage applied to the loading tube may be frequency or phase modulated in accordance with the teachings of this invention, that is, by using the same circuitry as described herein.

What is claimed is:

1. In a frequency control system for an amplitude modulated oscillator the output of which may be incidentally angularly modulated, means for injecting a stable frequency alternating voltage into said oscillator to lock the frequency of said oscillator to the frequency of said injection voltage, and means for applying the incidental angular modulation present on the oscillator output in opposite phase to the voltage injecting means.

2. In a frequency control system for an oscillator, a source of stable frequency alternating injection voltage coupled to feed voltage into said oscillator and to lock the frequency of said oscillator to the frequency of said source, means for mixing a portion of the oscillator output with a stable frequency voltage to produce a resultant wave, and means for utilizing said resultant wave to cause angular modulation of the voltage fed into said oscillator from said source.

3. In a frequency control system for an oscillator, a transmission line connecting the controlled oscillator to a load, a source of stable frequency alternating injection voltage coupled to feed voltage into said line, thereby to feed voltage into said oscillator and to lock the frequency of said oscillator to the frequency of said source, means for mixing a portion of the oscillator output with voltage of stable frequency to produce a resultant wave, and means for utilizing said resultant wave to cause angular modulation of the voltage fed into said line from said source.

4. In a frequency control system for a modulated oscillator, means for amplitude modulating the controlled oscillator, a transmission line connecting said oscillator to a load, a source of stable frequency alternating injection voltage coupled to feed voltage into said line, thereby to feed voltage into said oscillator and to lock the frequency of said oscillator to the frequency of said source, means for mixing a portion of the oscillator output with voltage of stable frequency to produce a beat frequency resultant wave which carries phase modulation present on the oscillator output, and means for utilizing said resultant wave to cause phase modulation of the voltage fed into said line from said source.

5. In a frequency control system for an oscillator, an amplifying output stage coupled to inject voltage into said oscillator, means for mixing a portion of the oscillator output with voltage of stable frequency to produce a resultant wave, means for supplying a voltage wave of stable frequency to said output stage as excitation therefor, and means for utilizing a characteristic of said resultant wave to phase modulate the excitation wave supplied to said output stage.

6. In a frequency control system for a modulated oscillator, means for amplitude modulating the controlled oscillator, a source of stable frequency alternating injection voltage, means coupled to said source and to said oscillator for feeding injection voltage into said oscillator to lock the frequency of said oscillator to the frequency of said source, means for mixing a portion of the oscillator output with a stable frequency voltage to produce a resultant wave, and means for utilizing said resultant wave to cause angular modulation of the voltage fed into said oscillator from said source.

7. In a frequency control system for an oscillator, an amplifying output stage coupled to inject voltage into said oscillator, means for detecting the angular modulation present on the oscillator output, means for supplying a voltage wave of stable frequency to said output stage as excitation therefor, and means for angularly modulating the excitation voltage supplied to said output stage, by the output of said detecting means.

8. In a frequency control system for a modulated oscillator, means for amplitude modulating the controlled oscillator, an amplifying output stage coupled to inject voltage into said oscillator, means for mixing a portion of the oscillator output with voltage of stable frequency to produce a beat frequency resultant wave which carries angular modulation present on the oscillator output, means for detecting the angular modulation carried by said resultant wave, means for supplying a voltage wave of stable frequency to said output stage as excitation therefor, and means for angularly modulating the excitation wave supplied to said output stage, by the output of said detecting means.

9. In a frequency control system for a modulated oscillator, means for amplitude modulating the controlled oscillator, an amplifying output stage coupled to inject voltage into said oscillator, means for mixing a portion of the oscillator output with voltage of stable frequency which is higher than the oscillator frequency, to produce a beat frequency resultant wave which carries phase modulation present on the oscillator output, and means for supplying said resultant wave to said output stage as excitation energy therefor.

10. In a frequency control system for an oscillator, a transmission line connecting the controlled oscillator to a load, a frequency multiplying output stage coupled to inject voltage into said line, means for mixing a portion of the oscillator output with voltage of stable frequency to produce a resultant wave, means for supplying a voltage wave of stable frequency to the input side of said multiplying stage as excitation therefor, and means for utilizing a characteristic of said resultant wave to phase modulate the excitation wave supplied to said multiplying stage.

11. In a frequency control system for a magnetron, a frequency multiplying output stage coupled to inject alternating voltage into said magnetron, means for mixing a portion of the magnetron output with voltage of stable frequency which is higher than the oscillator frequency, to produce a beat frequency resultant alternating wave, and means for supplying said resultant alternating wave to the input side of said multiplying stage as excitation therefor.

12. In a frequency control system for an oscillator, a transmission line connecting the controlled oscillator to a load, an amplifying output stage coupled to inject voltage into said line, means for mixing a portion of the oscillator output with voltage of stable frequency which is higher than the oscillator frequency, to produce a beat frequency resultant wave, means for supplying said resultant wave to said output stage as excitation therefor, and separate means for continuously coupling a voltage wave of said beat frequency to said output stage.

13. In a frequency control system for a modulated oscillator, means for amplitude modulating the controlled oscillator, an amplifying output stage coupled to inject voltage into said modulated oscillator, means for mixing a portion of the oscillator output with voltage of stable frequency which is higher than the oscillator frequency, to produce a beat frequency resultant wave which carries phase modulation present on the oscillator output, means for supplying said resultant wave to said output stage as excitation therefor, and separate means for continuously coupling a voltage wave of said beat frequency to said output stage.

References Cited in the file of this patent

UNITED STATES PATENTS

| Number | Name | Date |
|---|---|---|
| 2,227,595 | Linder | Jan. 7, 1941 |
| 2,419,615 | Weldon | Apr. 29, 1947 |
| 2,429,649 | Romander | Oct. 28, 1947 |
| 2,486,001 | Bruck et al. | Oct. 25, 1949 |
| 2,565,112 | Altar et al. | Aug. 21, 1951 |
| 2,602,156 | Donal | July 1, 1952 |
| 2,620,467 | Donal | Dec. 2, 1952 |